(12) United States Patent
Kawazoe et al.

(10) Patent No.: US 9,702,431 B2
(45) Date of Patent: Jul. 11, 2017

(54) DAMPER

(71) Applicant: AISIN SEIKI KABUSHIKI KAISHA, Kariya-shi, Aichi-ken (JP)

(72) Inventors: Hiroshi Kawazoe, Kariya (JP); Masaru Ebata, Chita (JP); Takuya Fujiwara, Anjo (JP); Miki Torii, Nishio (JP); Tomohiro Saeki, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/658,945

(22) Filed: Mar. 16, 2015

(65) Prior Publication Data
US 2015/0276013 A1  Oct. 1, 2015

(30) Foreign Application Priority Data
Mar. 27, 2014 (JP) ................. 2014-066928

(51) Int. Cl.
| F16F 15/123 | (2006.01) |
| F16F 15/134 | (2006.01) |
| F16F 15/139 | (2006.01) |
| F16F 15/14 | (2006.01) |

(52) U.S. Cl.
CPC .... *F16F 15/13484* (2013.01); *F16F 15/1392* (2013.01); *F16F 15/145* (2013.01)

(58) Field of Classification Search
CPC .................. F16F 15/13484; F16F 15/1392
USPC ..... 464/68.2–68.4; 192/201, 213.11, 213.21, 192/213.3, 214; 188/378
See application file for complete search history.

(56) References Cited

U.S. PATENT DOCUMENTS

| 2,613,515 | A | * | 10/1952 | Crutchley | ............. F16F 15/123 |
| | | | | | 192/214 |
| 4,620,621 | A | * | 11/1986 | Kulczycki | ............... F16D 41/08 |
| | | | | | 192/201 X |
| 4,788,884 | A | * | 12/1988 | Reik | ................. F16F 15/13128 |
| | | | | | 464/68.3 X |
| 5,398,562 | A | * | 3/1995 | Muchmore | ............. F02N 15/04 |
| | | | | | 464/68.4 |
| 8,161,739 | B2 | | 4/2012 | Degler et al. | |
| 8,403,762 | B2 | * | 3/2013 | Steinberger | ....... F16F 15/13492 |

(Continued)

FOREIGN PATENT DOCUMENTS

| DE | 10 2011 084 641 A1 | 4/2012 |
| JP | 2011-504986 A | 2/2011 |

*Primary Examiner* — Gregory Binda
(74) *Attorney, Agent, or Firm* — Buchanan Ingersoll & Rooney PC

(57) ABSTRACT

A damper includes a first, second, and third rotation member rotatable around a rotation axis, a first elastic portion interposed between the first rotation member and the second rotation member and elastically deformed by a relative rotation between the first rotation member and the second rotation member, a second elastic portion interposed between the second rotation member and the third rotation member and elastically deformed by a relative rotation between the second rotation member and the third rotation member, and a dynamic vibration absorber. The dynamic vibration absorber includes a rolling element that is positioned at an inner side relative to the first elastic portion and the second elastic portion in a radial direction of the rotation axis, and is rotatable relative to the second rotation member.

7 Claims, 11 Drawing Sheets

(56) References Cited

U.S. PATENT DOCUMENTS

2015/0276012 A1* 10/2015 Kawazoe .......... F16F 15/13484
464/68.2

* cited by examiner

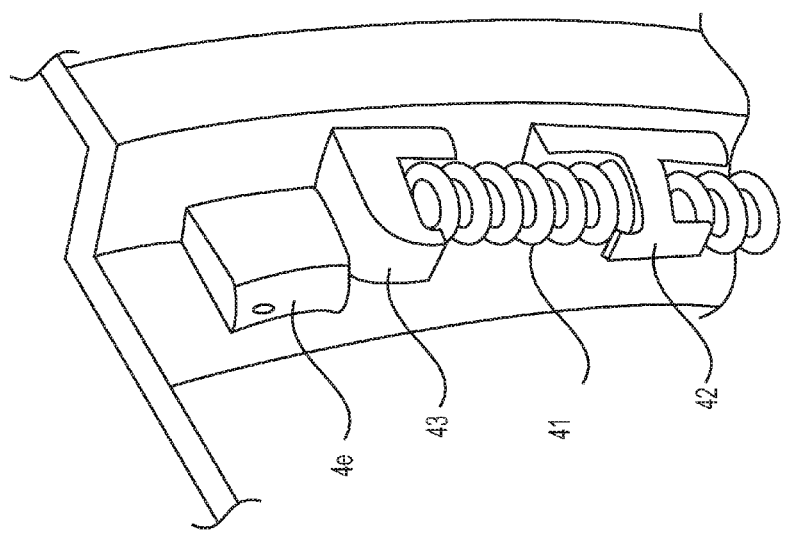
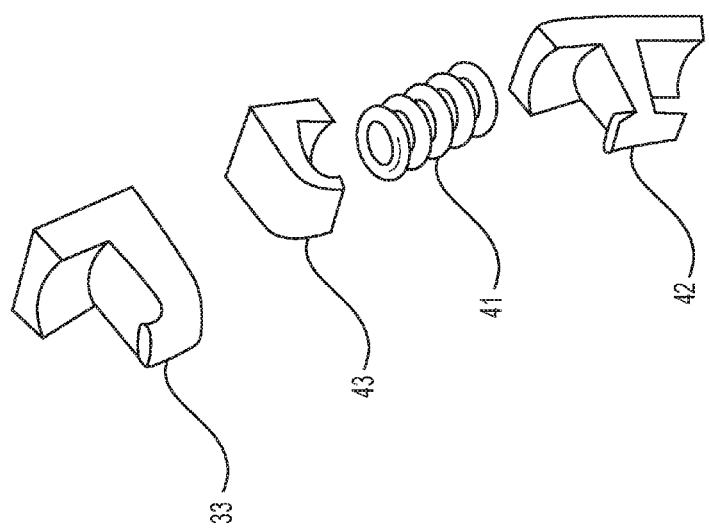

DAMPER

CROSS REFERENCE TO RELATED APPLICATIONS

This application is based on and claims priority under 35 U.S.C. §119 to Japanese Patent Application 2014-066928, filed on Mar. 27, 2014, the entire content of which is incorporated herein by reference.

TECHNICAL FIELD

This disclosure generally relates to a damper.

BACKGROUND DISCUSSION

A known damper, which is disclosed in JP2011-504986A, for example, includes a first elastic portion disposed between a first rotation member and a second rotation member, a second elastic portion disposed between the second rotation member and a third rotation member, and a dynamic vibration absorber mounted to the second rotation member.

According to the aforementioned damper, however, because the first elastic member and the dynamic vibration absorber are arranged to face each other in an axial direction, the damper may be enlarged in the axial direction. The damper is desirably reduced in size in the axial direction.

A need thus exists for a damper which is not susceptible to the drawback mentioned above.

SUMMARY

According to an aspect of this disclosure, a damper includes a first rotation member being rotatable around a rotation axis, a second rotation member being rotatable around the rotation axis, a third rotation member being rotatable around the rotation axis, a first elastic portion interposed between the first rotation member and the second rotation member and being elastically deformed by a relative rotation between the first rotation member and the second rotation member, a second elastic portion interposed between the second rotation member and the third rotation member and being elastically deformed by a relative rotation between the second rotation member and the third rotation member, and a dynamic vibration absorber including a rolling element that is positioned at an inner side relative to the first elastic portion and the second elastic portion in a radial direction of the rotation axis, the rolling element being rotatable relative to the second rotation member.

BRIEF DESCRIPTION OF THE DRAWINGS

The foregoing and additional features and characteristics of this disclosure will become more apparent from the following detailed description considered with the reference to the accompanying drawings, wherein:

FIG. 11 is a partial exploded view of the damper according to the first embodiment; and FIG. 12 is a partial perspective view of the damper according to the first embodiment.

DETAILED DESCRIPTION

Figure 1:
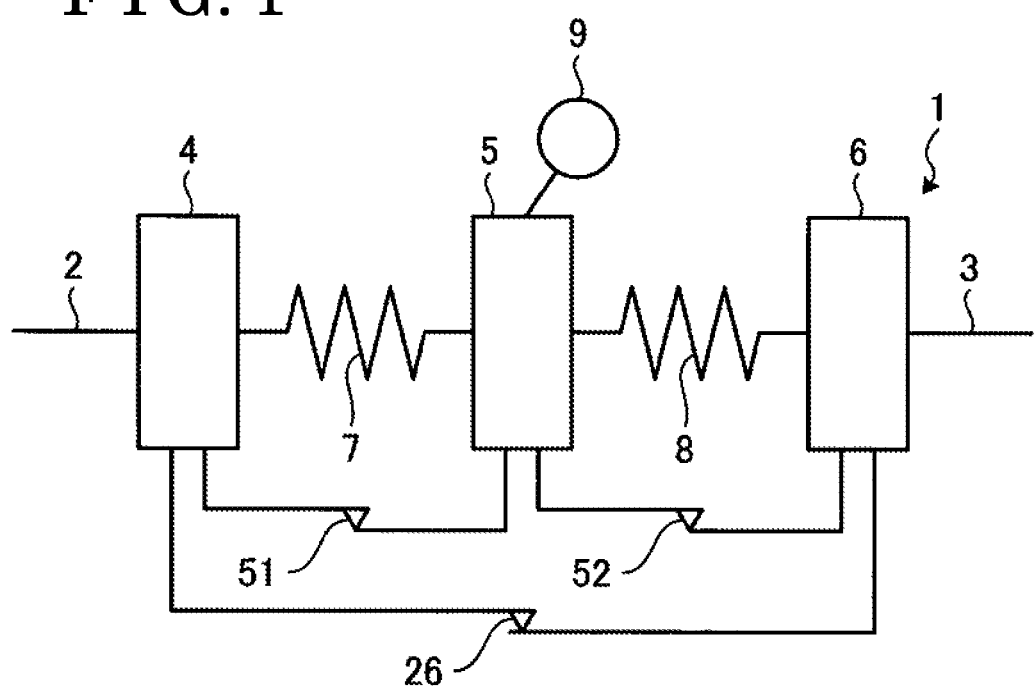
FIG. 1 is a schematic view of a damper according to a first embodiment disclosed here.

Embodiments will be explained with reference to the attached drawings. The plural embodiments include substantially similar components to one another. Thus, the substantially similar components bear the same reference numerals and duplication of explanation will be omitted.

A first embodiment is explained below. As illustrated in FIG. 1, a damper 1 serving as a torque fluctuation absorber is disposed, for example, between a power source and a passive portion (i.e., a driven portion) at a drive train of a vehicle. Specifically, the damper 1 is disposed between an output shaft 2 (i.e., a connection target) of the power source and an input shaft 3 (i.e., a connection target) of the passive portion for transmitting a motive power between the output shaft 2 and the input shaft 3. The damper 1 is configured to absorb (i.e., damp or restrain) a torque fluctuation and a torsional vibration generated by torsion between the output shaft 2 and the input shaft 3, for example. The damper 1 constitutes a power transmission passage together with the output shaft 2 and the input shaft 3. The power source includes an engine and an electric motor, for example, and the passive portion includes a transmission and a transaxle, for example. As the power source, a hybrid system including both the engine and the motor may be also employed.

A rotation axis Ax (i.e., a rotation center, refer to FIGS. 2 and 3) of the damper 1 serves as a rotation axis of each rotation member included in the damper 1. The rotation axis Ax substantially coincides with each rotation axis of the output shaft 2 or the input shaft 3. In the following, unless otherwise specified, an axial direction, a radial direction and a circumferential direction are defined on the basis of the rotation axis Ax. Further, for convenience in the following discussion, a side where the engine is provided in the axial direction (corresponding to a left side in FIG. 1) is referred to as a first side in the axial direction while a side where the transmission is provided in the axial direction (corresponding to a right side in FIG. 1) is referred to as a second side in the axial direction. The first side in the axial direction is indicated by an arrow X and a radially outer side is indicated by an arrow R in the drawings. Furthermore, a direction in which the damper 1 rotates by a driving force of a drive source is referred to as a forward rotation direction which is indicated by an arrow (direction) F in the drawings.

The damper 1 includes three (plural) rotation members 4, 5, 6 (a mass body, a flywheel mass, and an inertia body), two (plural) elastic portions 7, 8, a dynamic vibration absorber 9 and a hysteresis portion 10, for example.

The rotation members 4 to 6 are connected in series at the power transmission passage. The rotation members 4 to 6 are rotatable about the rotation axis Ax. The rotation member 4 is connected to the output shaft 2 so as to be integrally rotatable therewith. That is, the rotation member 4 receives a rotational driving force from the outside of the damper 1. The rotation member 6 is connected to the input shaft 3 so as to be integrally rotatable therewith. The rotation member 5 is disposed between the rotation members 4 and 6 to be connected thereto via the elastic portions 7 and 8. In the embodiment, as an example, the rotation member 4 serves as a first rotation member, the rotation member 5 serves as a second rotation member, and the rotation member 6 serves as a third rotation member.

The elastic portions 7 and 8 are connected in series. The elastic portion 7 is disposed between the rotation members 4 and 5. The elastic portion 7 is elastically deformed by a relative rotation between the rotation members 4 and 5. The elastic portion 7 absorbs, by its elastic deformation, a torque fluctuation between the rotation members 4 and 5. The elastic portion 8 is disposed between the rotation members 5 and 6. The elastic portion 8 is elastically deformed by a relative rotation between the rotation members 5 and 6. The elastic portion 8 absorbs, by its elastic deformation, a torque fluctuation between the rotation members 5 and 6. In the embodiment, as an example, the elastic portion 7 serves as a first elastic portion while the elastic portion 8 serves as a second elastic portion.

The hysteresis portion 10 is arranged between the rotation members 4 and 6 via the rotation member 5. The hysteresis portion 10 reduces vibrations of the rotation members 4 to 6, i.e., vibrations between the output shaft 2 and the input shaft 3, by hysteresis torque based on friction.

The dynamic vibration absorber 9 is mounted at the rotation member 5. The dynamic vibration absorber 9 restrains a torsional vibration generated between the rotation member 4 (i.e., the output shaft 2) and the rotation member 6 (i.e., the input shaft 3).

Figure 2:
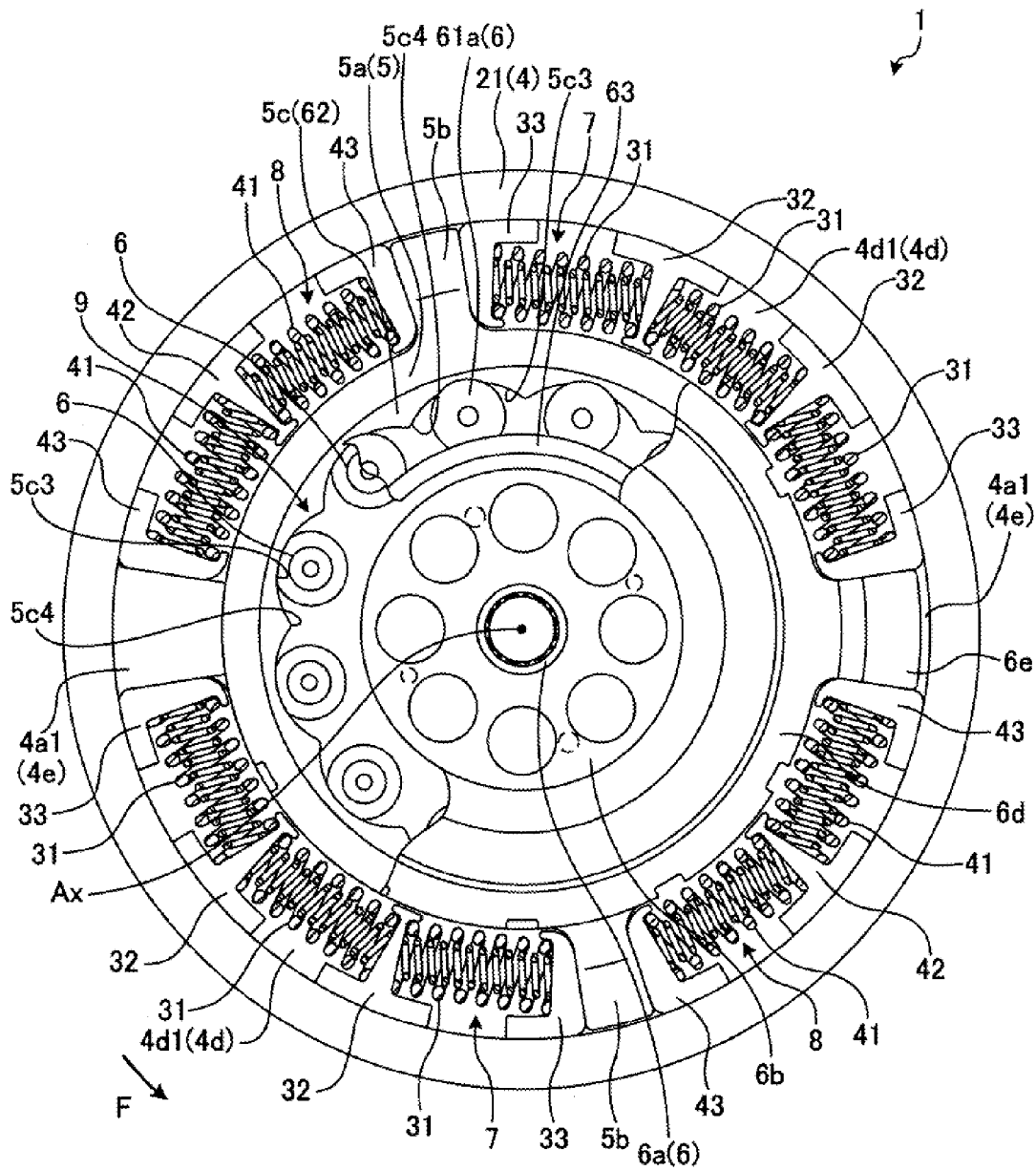
FIG. 2 is a front view (a partially cutaway view) of the damper when viewed in an axial direction according to the first embodiment.
Figure 3:
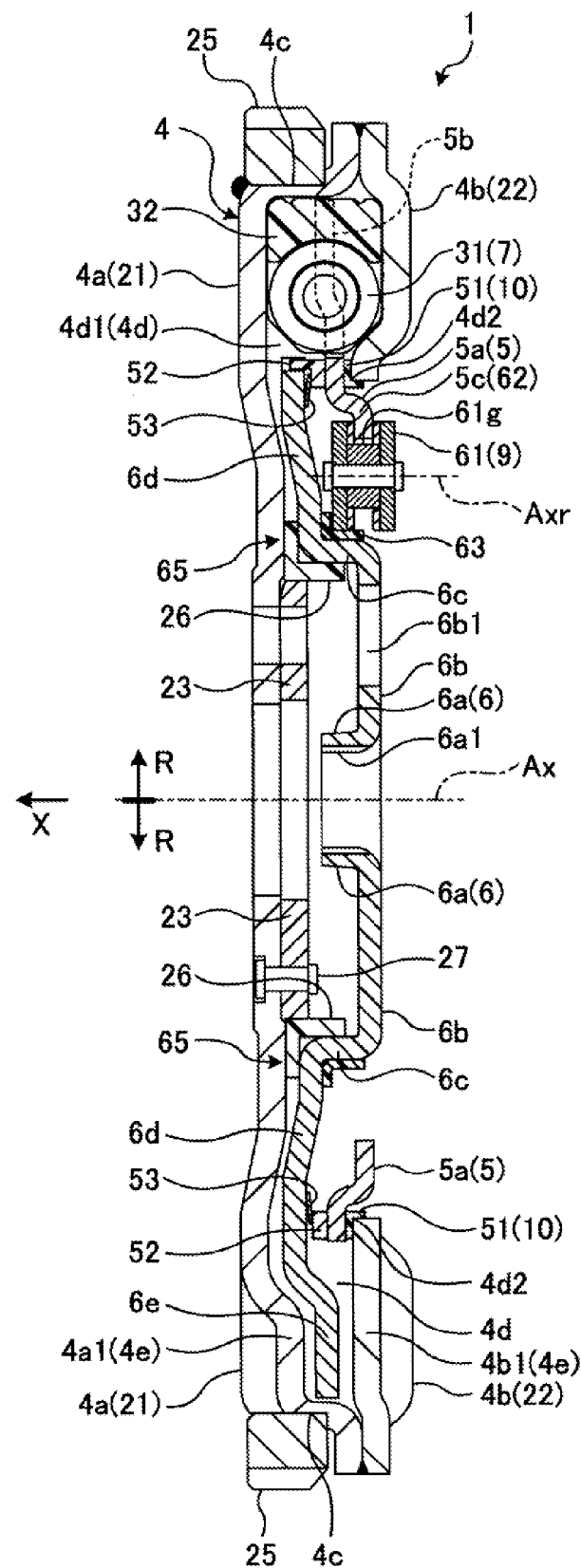
FIG. 3 is a cross-sectional view of the damper according to the first embodiment.

The components and members of the damper 1 will be explained in detail with reference to FIGS. 2 and 3. In FIG. 2, some of the components and members are omitted.

The rotation member 4 includes a pair of wall portions 4a, 4b positioned to be spaced away from each other in the axial direction, and a connection portion 4c formed between the wall portions 4a and 4b to extend over the wall portions 4a and 4b. Each of the wall portions 4a and 4b is annularly formed around the rotation axis Ax to extend in the radial direction. The wall portion 4b is positioned at the second side (the right side in FIG. 3) of the wall portion 4a in the axial direction. The wall portion 4b covers an outer peripheral portion of the wall portion 4a. The connection portion 4c is formed in an annular form around the rotation axis Ax by extending across an outer peripheral portion (i.e., an end portion at a radially outer side) of the wall portion 4a and an outer peripheral portion of the wall portion 4b. The wall portions 4a, 4b, and the connection portion 4c may be made of metallic material, for example. In the embodiment, the wall portion 4a is connected to the output shaft 2 via a flywheel (i.e., an external rotation member) so that the rotation member 4 rotates integrally with the output shaft 2.

The rotation member 4 includes a housing chamber 4d (a void) formed to be surrounded by the wall portions 4a, 4b, and the connection portion 4c. That is, the housing chamber 4d is formed between the wall portions 4a and 4b. The elastic portions 7 and 8 are housed in the housing chamber 4d. The wall portion 4a includes a support portion 4a1 (a portion) that overlaps the elastic portions 7 and 8 in the circumferential direction. The support portion 4a1 includes a protrusion surface at the second side in the axial direction. That is, the support portion 4a1 is formed to protrude towards the wall portion 4b (i.e., towards the second side in the axial direction into the housing chamber 4d). In addition, the wall portion 4b includes a support portion 4b1 (a portion) that overlaps the elastic portions 7 and 8 in the circumferential direction. The support portion 4b1 includes a protrusion surface at the first side in the axial direction. That is, the support portion 4b1 is formed to protrude towards the wall portion 4a (i.e., towards the first side in the axial direction into the housing chamber 4d). The support portions 4a1 and 4b1 overlap (i.e., face) in the axial direction while being spaced away from each other in the axial direction. Specifically, the plural (for example, two) support portions 4a1 are formed to be spaced away from each other in the circumferential direction while the plural (for example, two) support portions 4b1 are formed to be spaced away from each other in the circumferential direction. The support portions 4a1 and 4b1 overlapping in the axial direction constitute a support portion 4e. That is, in the embodiment, the rotation member 4 includes the plural (for example, two) support portions 4e positioned to be spaced away from each other in the circumferential direction. The plural support portions 4e divide the housing chamber 4d into plural (for example, two) housing sections 4d1 (portions or voids) facing in the circumferential direction. The elastic portions 7 and 8 are housed in each of the housing sections 4d1.

The rotation member 4 is constituted by plural members, for example. In the embodiment, the rotation member 4 includes plates 21, 22 and 23. The plate 21 includes a portion of the wall portion 4a including the support portion 4a1, and a portion of the connection portion 4c. The plate 22 includes the wall portion 4b including the support portion 4b1 and a portion of the connection portion 4c. The plate 23 includes a portion of the wall portion 4a. Outer end portions of the plates 21 and 22 overlap each other so as to be connected or secured by welding, for example. The plate 23 is connected or secured to the plate 21 by a fastening member 27 such as a rivet, for example, in a state overlapping the plate 21 at the second side thereof in the axial direction (at the right side in FIG. 3). The plate 23 is smaller in diameter than the plate 21. The plates 21 and 23 are fastened together to the flywheel by a fastening member such as a bolt, for example. Accordingly, because the plates 21 and 23 are fastened together to the flywheel by the fastening member such as a bolt, for example, the number of components may be reduced as compared to a construction where the plates 21 and 23 are not fastened together to the flywheel. In addition, a gear 25 is provided at the rotation member 4. The gear 25 is connected or fixed to the connection portion 4c of the plate 21 by welding, for example. The gear 25 is connected to an engine starter.

The rotation member 5 includes a wall portion 5a formed annularly around the rotation axis Ax, and a protruding portion 5b serving as a support portion protruding radially outwardly from the wall portion 5a. An outer edge portion of the wall portion 5a is positioned within the housing chamber 4d while an inner edge portion (i.e., an end portion at a radially inner side) of the wall portion 5a is positioned out of the housing chamber 4d. Specifically, the plural (for example, two) protruding portions 5b are provided to be spaced away from each other in the circumferential direction. The protruding portions 5b are positioned within the respective housing sections 4d1 of the rotation member 4.

Each of the protruding portions 5b is housed in each of the housing sections 4d1 of the rotation member 4. In the embodiment, as an example, the rotation member 5 is constituted by a single plate. In addition, the dynamic vibration absorber 9 is provided at the inner edge portion of the wall portion 5a. The rotation member 5 is connected to the rotation members 4 and 6 via the hysteresis portion 10.

The rotation member 6 includes a cylindrical portion 6a, a wall portion 6b protruding radially outwardly from the cylindrical portion 6a, a wall portion 6c protruding from the wall portion 6b to the first side (the left side in FIG. 3) in the axial direction, and a wall portion 6d protruding radially outwardly from the wall portion 6c. Each of the cylindrical portion 6a and the wall portions 6b, 6c, 6d is formed annularly around the rotation axis Ax. The rotation member 6 also includes a protruding portion 6e serving as a support portion protruding radially outwardly from an outer edge portion of the wall portion 6d. Specifically, the plural (for example, two) protruding portions 6e are formed to be spaced away from each other in the circumferential direction. The protruding portions 6e are positioned within the housing chamber 4d of the rotation member 4. Specifically, the protruding portions 6e are positioned between the support portion 4a1 and the support portion 4b1 in the axial direction (see FIG. 3). Each of the protruding portions 6e overlaps the support portions 4a1 and 4b1 in the axial direction in a state being spaced away from the support portions 4a1 and 4b1. In the embodiment, the rotation member 6 is constituted by a single plate, for example.

A spline 6a1 is formed at an inner peripheral surface of the cylindrical portion 6a. The input shaft 3 is connected or secured to the spline 6a1 so that the rotation member 6 integrally rotates with the input shaft 3. A bore 6b1 is formed at the wall portion 6b to penetrate therethrough in the axial direction. The bore 6b1 allows a passage of a fastening member such as a bolt, for example, that fastens the plates 21, 23 and the flywheel. The spline 6a1 is positioned at the radially inner side relative to the bore 6b1.

A thrust member 26 is disposed between the rotation member 6 and the rotation member 4. Specifically, the thrust member 26 is arranged between the wall portion 6d and the wall portion 4a. The thrust member 26 is positioned at the radially inner side relative to the elastic portions 7 and 8. The thrust member 26 is provided at a stepped portion formed or obtained by the plates 21 and 23. The thrust member 26 is connected to the plate 23. The thrust member 26 is slidable relative to the rotation member 6 in the circumferential direction. Because the thrust member 26 and the rotation member 6 slide (rotate) relative to each other, a frictional resistance is generated between the thrust member 26 and the rotation member 6. That is, the thrust member 26 generates the frictional resistance in a case where the rotation members 4 and 6 rotate relative to each other. In this case, the thrust member 26 may slide or rotate in the circumferential direction relative to the rotation member 4 or to both the rotation members 4 and 6. The thrust member 26 is also disposed between the rotation members 4 and 6 in the radial direction so as to function as a slide bearing for allowing the relative rotation between the rotation members 4 and 6. The rotation member 4 supports the rotation member 6 so that the rotation member 6 is rotatable about the rotation axis Ax via the thrust member 26. In the embodiment, as an example, the thrust member 26 serves as a first intervening member.

Figure 10:
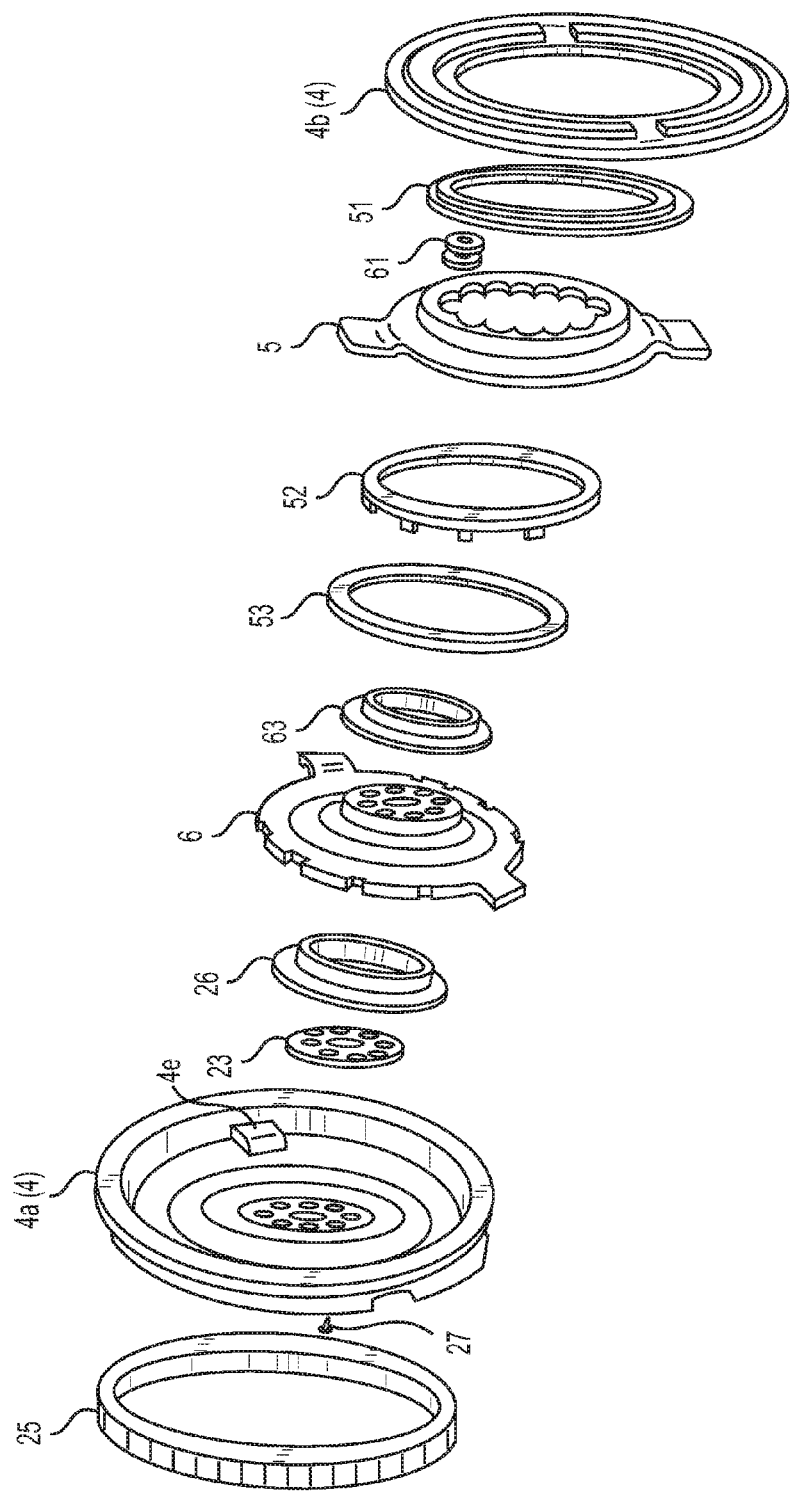
FIG. 10 is an exploded view of the damper according to the first embodiment.

The elastic portion 7 includes plural elastic members 31 disposed between the rotation members 4 and 5. The plural elastic members 31 are connected in series in the circumferential direction. Torque (rotation) is transmitted between the rotation members 4 and 5 via the elastic members 31. The rotation member 5 is rotatable relative to the rotation member 4 within a range in which the elastic members 31 are allowed to expand and contract (i.e., within a predetermined angle range). In the embodiment, the plural (for example, two) elastic portions 7 are provided. The elastic portions 7 are not illustrated in the FIG. 10 exploded view for clarity purposes. A support member 33 of an elastic portion 7 is shown in the FIG. 11 partial exploded view.

The elastic members 31 function as compression springs that compress (i.e., elastically deform or expand and compress) along a tangential direction relative to the circumferential direction, for example. The elastic members 31 are formed by coil springs, for example. Specifically, each of the elastic members 31 is formed by a coil spring in a straight form of which winding axis is linear. The winding axis of the coil spring (the elastic member 31) extends substantially along the tangential direction relative to the circumferential direction. In the embodiment, the elastic members 31 are housed in the housing chamber 4d, specifically, the plural (for example, three) elastic members 31 are housed in each of the housing sections 4d1. The plural elastic members 31 housed in each of the housing sections 4d1 are disposed between the support portion 4e and the protruding portion 5b which is positioned at a front side of the aforementioned support portion 4e in the forward rotation direction (i.e., in the counterclockwise direction in FIG. 2 corresponding to the direction F). The elastic members 31 arranged within each of the housing sections 4d1 are connected in series in the circumferential direction by support members 32 serving as support portions, holding portions, holding members, seats, or retainers, for example. In addition, the plural elastic members 31 connected in series within each of the housing sections 4d1 are disposed and supported between a pair of support members 33 in the circumferential direction. That is, the support portion 4e and the protruding portion 5b support the elastic members 31 via the support members 33. The support members 32 and 33 include a function, for example, to stably support the elastic members 31, to cause the elastic members 31 to stably elastically deform (expand and contract), and to restrain a direct contact between the elastic members 31 and the rotation members 4, 5, 6. The support members 32 and 33 are supported by the rotation member 4 to be movable in the circumferential direction within the housing chamber 4d. The support members 32 and 33 are made of synthetic resin material, for example.

As mentioned above, the elastic members 31 and the support members 32, 33 are sandwiched and held between the support portion 4e and the protruding portion 5b. The elastic members 31 expand and contract in response to a difference between an input torque at the rotation member 4 and a load torque at the rotation member 5. Specifically, in the embodiment, in a case where a torque fluctuation (fluctuation in torque difference) is generated between the rotation member 4 and the rotation member 5, for example, the elastic members 31 elastically contract to tentatively store an elastic energy converted from a rotation energy which is obtained in response to the torque fluctuation. The elastic energy that is tentatively stored at the elastic members 31 is converted to a rotation energy (torque) when the elastic members 31 expand elastically.

The elastic portion 8 includes plural elastic members 41 disposed between the rotation members 5 and 6. The plural elastic members 41 are connected in series in the circumferential direction. Torque (rotation) is transmitted between the rotation members 5 and 6 via the elastic members 41.

The rotation member 6 is rotatable relative to the rotation member 4 within a range in which the elastic members 41 are allowed to expand and contract (i.e., within a predetermined angle range). In the embodiment, the plural (for example, two) elastic portions 8 are provided. In addition, the elastic portions 7 and 8 are disposed in line along the circumferential direction. Further, the elastic portions 7 and 8 are alternately positioned in the circumferential direction.

In the embodiment, the elastic members 41 function as compression springs that compress (i.e., elastically deform or expand and compress) along the tangential direction relative to the circumferential direction, for example. The elastic members 41 are formed by coil springs, for example. Specifically, in the same way as the elastic members 31, each of the elastic members 41 is formed by a coil spring in a straight form. The winding axis of the coil spring (elastic member 41) extends substantially along the tangential direction relative to the circumferential direction. In the embodiment, the elastic members 41 are housed in the housing chamber 4d, specifically, the plural (for example, two) elastic members 41 are housed in each of the housing sections 4d1. The elastic members 41 housed in each of the housing sections 4d1 are disposed between the protruding portion 5b and the protruding portion 6e which is positioned at a front side of the aforementioned protruding portion 5b in the forward rotation direction (i.e., in the counterclockwise direction in FIG. 2 corresponding to the direction F). The elastic members 41 arranged within each of the housing sections 4d1 are connected in series in the circumferential direction by a support member 42 serving as a support portion, a holding portion, a holding member, a seat, or a retainer, for example. The plural elastic members 41 connected in series within each of the housing sections 4d1 are disposed and supported between a pair of support members 43 in the circumferential direction. That is, the protruding portion 5b and the protruding portion 6e support the elastic members 41 via the support members 43. The support members 42 and 43 include a function, for example, to stably support the elastic members 41, to cause the elastic members 41 to stably elastically deform (expand and contract), and to restrain a direct contact between the elastic members 41 and the rotation members 4, 5, 6. The support members 42 and 43 are supported by the rotation member 4 to be movable in the circumferential direction within the housing chamber 4d. The support members 42 and 43 are made of synthetic resin material, for example. In the embodiment, the configurations of the elastic members 41 and the support members 42, 43 are substantially the same as the configurations of the elastic members 31 and the support members 32, 33, respectively, for example. Each of the elastic members 31 and 41 may be formed by a coil spring in a straight form which is curved along the circumferential direction for assembly or a coil spring of which winding axis is curved along the circumferential direction (i.e., a so-called arc-shaped spring or arc spring), or formed by a flat coil spring including a flat external form, for example. Each of the elastic portions 7 and 8 may be configured to include the single elastic member 31 or 41.

As mentioned above, the elastic members 41 and the support members 42, 43 are sandwiched and held between the protruding portion 5b and the protruding portion 6e. The elastic members 41 expand and contract in response to a difference between an input torque at the rotation member 5 and a load torque at the rotation member 6. Specifically, in the embodiment, in a case where a torque fluctuation (fluctuation in torque difference) is generated between the rotation member 5 and the rotation member 6, the elastic members 41 elastically contract to tentatively store an elastic energy converted from a rotation energy which is obtained in response to the torque fluctuation. The elastic energy that is tentatively stored at the elastic members 41 is converted to a rotation energy (torque) when the elastic members 41 expand elastically. The elastic portions 8 are not illustrated in the FIG. 10 exploded view for clarity purposes. An elastic member 41 and support members 42 and 43 of an elastic portion 8 are shown in the FIG. 11 partial exploded view. Furthermore, FIG. 12 illustrates in perspective view how elastic member 41 and support members 42 and 43 making up an elastic portion 8 are fitted at the rotation member 4. The elastic members 31 and support members 32 and 33 making up elastic portions 7 are fitted at the rotation member 4 in a similar manner.

The hysteresis portion 10 includes a pair of thrust members 51 and 52 between which the wall portion 5a of the rotation member 5 is sandwiched, and an elastic member 53 that biases the thrust member 52.

The thrust members 51 and 52 are annularly formed around the rotation axis Ax. The thrust members 51 and 52 are positioned at the radially inner side relative to the elastic members 31 and 41 (the elastic portions 7 and 8). The thrust member 51 is disposed between the rotation members 4 and 5 and is connected or secured to the wall portion 4b of the rotation member 4 to integrally rotate therewith. That is, the thrust member 51 is provided to be rotatable about the rotation axis Ax. The thrust member 52 is disposed between the rotation members 5 and 6. The thrust member 52 is connected or secured to the wall portion 6d of the rotation member 6 to integrally rotate therewith. That is, the thrust member 52 is provided to be rotatable about the rotation axis Ax. In addition, the thrust member 52 is connected to the wall portion 6d to be axially movable. The elastic member 53 is formed by a disc spring, for example. The elastic member 53 is disposed between the wall portion 6d of the rotation member 6 and the thrust member 52. The elastic member 53 is supported at the wall portion 6d to integrally rotate with the rotation member 6. That is, the elastic member 53 is rotatable about the rotation axis Ax. The elastic member 53 biases the thrust member 52 towards the wall portion 5a (towards the thrust member 51 and the wall portion 4b) by an elastic force. Accordingly, the elastic member 53 causes the thrust member 51 and each of the rotation members 4 and 5 (the wall portion 4b and the wall portion 5a) to be pressed against each other and causes the thrust member 52 and the rotation member 5 (the wall portion 5a) to be pressed against each other. Because of the elastic force of the elastic member 53, the thrust members 51 and 52 are in press-contact with the rotation member 5. At this time, the thrust members 51 and 52 are rotatable relative to the rotation member 5 in the circumferential direction. In the embodiment, in a case where the rotation members 4 and 5 relatively rotate each other, the thrust member 51 generates a friction resistance relative to the rotation member 5. In a case where the rotation members 5 and 6 relatively rotate each other, the thrust member 52 generates a friction resistance relative to the rotation member 5. The hysteresis portion 10 reduces vibrations of the rotation members 4 to 6 by hysteresis torque based on the friction resistance generated between the rotation member 5 and each of the thrust members 51 and 52. In addition, the elastic member 53 functions as a disc spring for hysteresis function (generation of friction resistance) of the thrust member 26. The thrust member 51 serves as a third intervening member. The thrust member 52 serves as a fourth intervening member. The elastic member 53 serves as a third elastic portion.

The dynamic vibration absorber 9, which is a centrifugal pendulum absorber, includes plural rolling elements 61 (rollers, mass bodies, or weights, for example) and a support portion 62 supporting the plural rolling elements 61. The dynamic vibration absorber 9 restrains a torsional vibration by inertia which is generated by rolling of the plural rolling elements 61. The FIG. 10 exploded view illustrates only one set of rolling elements 61 (as well as only one support portion 4e) for clarity purposes, but multiple such elements are provided, as illustrated in FIG. 1.

The rolling elements 61 are positioned at the radially inner side of the elastic portions 7 and 8 so as to be rotatable relative to the rotation member 5. The rolling elements 61 are provided at an outside of the housing chamber 4d. The rolling elements 61 are rotatable about a rotation axis Axr serving as a rotation center or a rolling center in parallel to the rotation axis Ax.

Figure 4:
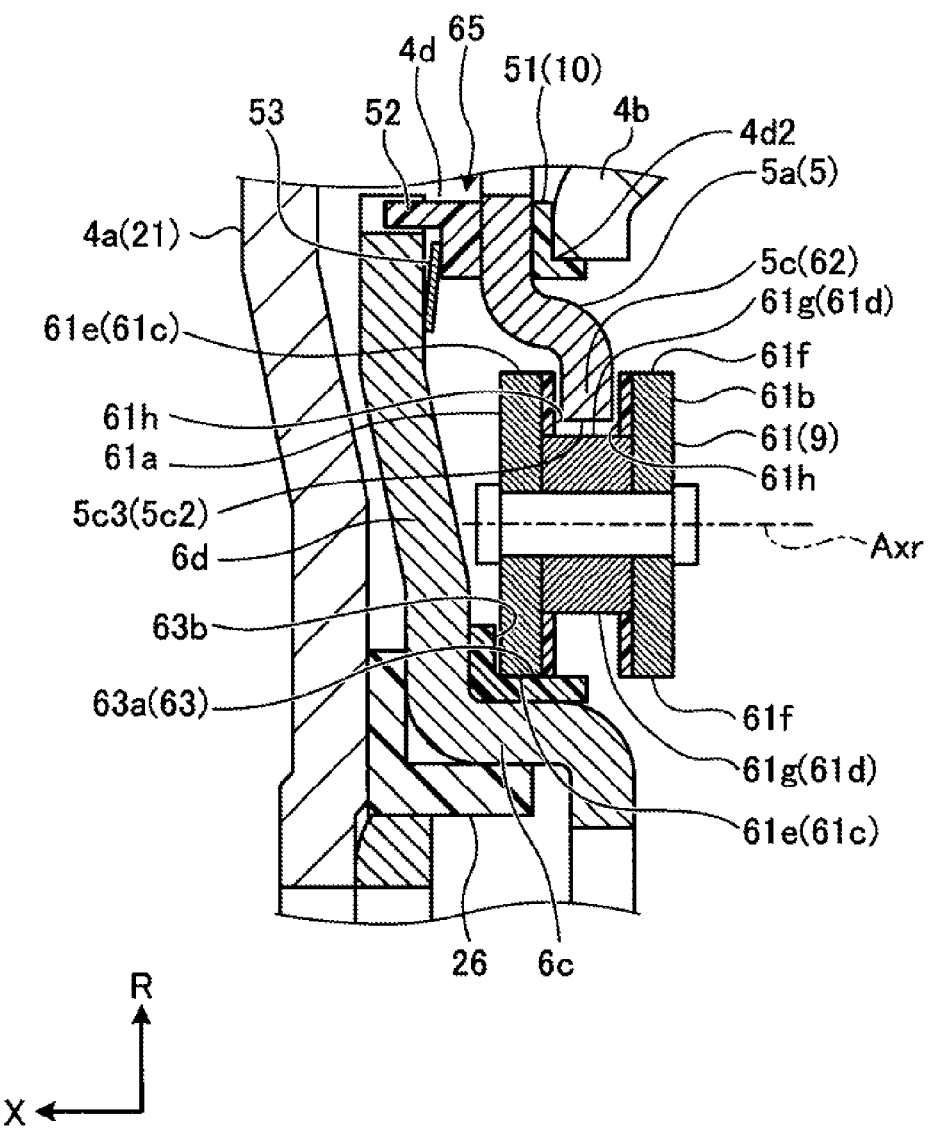
FIG. 4 is a cross-sectional view of a portion of the damper in FIG. 3.

As illustrated in FIG. 4, each of the rolling elements 61 includes first and second end surfaces 61a and 61b serving as opposed end surfaces in the axial direction, and a connection surface 61c (a peripheral surface) formed to extend between the first and second end surfaces 61a and 61b. The first end surface 61a faces the first side in the axial direction while the second end surface 61b faces the second side in the axial direction. The connection surface 61c is formed annularly around the rotation axis Axr. A recess portion 61d serving as a groove portion is formed at the connection surface 61c so as to be recessed towards the rotation axis Axr. The recess portion 61d is formed annularly around the rotation axis Axr. The connection surface 61c includes a first surface 61e positioned at the first side of the recess portion 61d in the axial direction and a second surface 61f positioned at the second side of the recess portion 61d in the axial direction. The first and second surfaces 61e and 61f constitute an outermost peripheral surface of the rolling element 61. The recess portion 61d includes a surface 61g forming a bottom surface of the recess portion 61d to extend in the axial direction and a pair of surfaces 61h extending radially outwardly from the surface 61g. The rolling element 61 may be constituted by a combination of plural members, for example. In addition, the surfaces 61h may be made of synthetic resin material, for example. Accordingly, a sliding resistance between the rolling element 61 and a guide portion 5c (which will be explained later) may be reduced. In the embodiment, a friction coefficient of the surface 61h is smaller than a friction coefficient of each of the end surfaces 61a and 61b.

The support portion 62 includes the guide portion 5c provided at the rotation member 5 and a restriction member 63 provided at the rotation member 6. The plural rolling elements 61 are disposed between the guide portion 5c and the restriction member 63. The rolling elements 61 are positioned at substantially even intervals in the circumferential direction (i.e., angular intervals around the rotation axis Ax).

The guide portion 5c is integrally formed at the rotation member 5. The guide portion 5c is provided at the inner edge portion of the wall portion 5a and is formed annularly around the rotation axis Ax. An inner edge portion of the guide portion 5c enters to be positioned within the recess portion 61d of the rolling element 61. The width of the guide portion 5c (the wall portion 5a) in the axial direction is smaller than the width of the recess portion 61d in the axial direction. That is, at least one of the surfaces 61h and the guide portion 5c forms a clearance therebetween. As a result, a friction between the rolling element 61 and the guide portion 5c (the wall portion 5a) may be reduced. The guide portion 5c supports the rolling element 61 in the axial direction in a state where one of the surfaces 61h of the rolling element 61 is in contact with the guide portion 5c. The guide portion 5c includes a guide surface 5c2 that makes contact with the surface 61g. As illustrated in FIG. 2, the guide surface 5c2 includes recessed portions 5c3 (recessed surfaces or recessed curved surfaces) recessed radially outwardly and protruding portions 5c4 (protruding surfaces or protruding curved surfaces) protruding radially inwardly. The recessed portions 5c3 and the protruding portions 5c4 are alternately arranged one another in the circumferential direction at substantially even intervals (i.e., angular intervals around the rotation axis Ax). The recessed portions 5c3 and the protruding portions 5c4 are formed as curved surfaces along the axial direction of the rotation axis Ax. The recessed portions 5c3 and the protruding portions 5c4 are smoothly connected to one another. The recessed portions 5c3 and the protruding portions 5c4 serve as the surfaces that are contactable with the surface 61g of the rolling element 61.

The dynamic vibration absorber 9 rotates around the rotation axis Ax. Thus, the rolling elements 61 receive a centrifugal force to be pressed against the guide portion 5c. Specifically, the surfaces 61g of the respective rolling elements 61 are pressed against the guide surface 5c2. The rolling elements 61 are rollable or rotatable on the recessed portions 5c3 or the protruding portions 5c4, i.e., rollable or rotatable in a state being in contact with the recessed portions 5c3 or the protruding portions 5c4, in association with a rotational fluctuation (acceleration or deceleration, change of angular acceleration, and the like).

The restriction member 63 is disposed between the rotation member 6 and the rolling elements 61. The restriction member 63 is connected to the rolling elements 6 and formed annularly around the rotation axis Ax. As illustrated in FIG. 4, the restriction member 63 includes a wall portion 63a and a wall portion 63b. The wall portions 63a and 63b are formed annularly around the rotation axis Ax. The wall portion 63a is formed overlapping a radially outer surface of the wall portion 6c. The wall portion 63a faces the first surface 61e of the rolling element 61 in the radial direction. That is, the wall portion 63a is positioned between the wall portion 6c and the rolling element 61 in the radial direction. The wall portion 63b is formed overlapping a surface of the wall portion 6d at the second side in the axial direction in a state facing the first end surface 61a of the rolling element 61. That is, the wall portion 63b is positioned between the wall portion 6d and the rolling element 61 in the axial direction. The wall portion 63b and the first end surface 61a form a clearance therebetween.

The wall portion 63a supports the rolling elements 61 in the radial direction in a state where the rolling elements 61 are inhibited from receiving the centrifugal force and the wall portion 63a is in contact with each of the first surfaces 61e of the rolling elements 61. Thus, the wall portion 63a restricts the rolling elements 61 from disengaging from the guide portion 5c. That is, the rotation member 6 supports the rolling elements 61 via the restriction member 63. In a case where the rolling elements 61 are pressed against the guide portion 5c by the centrifugal force, the rolling elements 61 are away from the restriction member 63. The restriction member 63 is formed as a separate member from the rotation member 5 and is connected to the rotation member 5, for example. The restriction member 63 is made of synthetic resin material, for example. Because the restriction member 63 is made of synthetic resin material, sound generated when the first surface 61e of each of the rolling elements 61 makes contact with the wall portion 63a may be reduced. The restriction member 63 serves as a second intervening member.

In addition, in the embodiment, grease is filled in the housing chamber 4d illustrated in FIG. 2. At least outer edge portions of the members housed in the housing chamber 4d, i.e., the elastic members 31, 41, the support members 32, 33, 42, 43, and the like, are immersed in grease. Accordingly, the aforementioned members housed in the housing chamber 4d are restrained from directly contacting the wall portions 4a, 4b, and the connection portion 4c which define the housing chamber 4d. The abrasion of the elastic members 31, 41, the support members 32, 33, 42, 43, and the like housed in the housing chamber 4d, the wall portions 4a, 4b and the connection portion 4c may be restrained. In addition, grease may remain by its viscosity within the housing chamber 4d. Accordingly, leakage of grease to the outside of the housing chamber 4d is restrained.

Further, an opening portion 4d2 (a portion between the wall portions 4a and 4b) of the housing chamber 4d at the inner peripheral side is closed or sealed by the thrust members 26, 51, 52, the elastic member 53, and the wall portions 5a, 6d. That is, the thrust members 26, 51, 52, the elastic member 53, and the wall portions 5a, 6d constitute a closing portion 65 (a seal portion) that seals or closes the opening portion 4d2. Thus, even in a case where a large impact is applied to the damper 1, for example, leakage of grease to the outside of the housing chamber 4d may be restrained. Adhesion of grease to the rolling elements 61 may be restrained.

In the present embodiment, the rolling elements 61 of the dynamic vibration absorber 9 are positioned at the inner side of the elastic portions 7 and 8 in the radial direction of the rotation axis Ax. Thus, as compared to a case where the rolling elements 61 are arranged facing the elastic portions 7 and 8 in the axial direction, the damper 1 may be reduced in size in the axial direction, for example.

In addition, in the present embodiment, at least one of (for example, both of) the elastic portions 7 and 8 includes the plural elastic members 31 or 41 connected in series in the circumferential direction of the rotation axis Ax. Thus, a coil spring in a straight form of which winding axis is linear may be simply used as the elastic member, for example. One of the elastic portions 7 and 8 may include the single elastic member 31 or 41.

Further, in the present embodiment, the rotation member 4 supports the rotation member 6 via the thrust member 26 while the rotation member 6 supports the rolling elements 61 via the restriction member 63. Thus, the rotation member 4 functions as the support member for supporting the rotation member 6 and the rotation member 6 functions as the support member for supporting the rolling elements 61, which may lead to a relatively simple structure of supporting the rotation member 6 and/or the rolling elements 61.

Furthermore, in the present embodiment, the thrust members 51, 52, and the elastic member 53 collectively serve as a portion of the closing portion 65, i.e., the thrust members 51, 52, and the elastic member 53 are included in the closing portion 65 for closing the opening portion 4d2 of the housing chamber 4d. Thus, the members (the thrust members 51, 52 and the elastic member 53) which generate a friction resistance also function to close the opening portion 4d2 of the housing chamber 4d, which may achieve the damper 1 with a relatively simple construction.

In the embodiment, the housing chamber 4d is provided at the rotation member 4 (the first rotation member). Alternatively, the housing chamber 4d may be provided at the rotation member 6 (the third rotation member). In this case, the configuration of the rotation member 4 and the configuration of the rotation member 6 may be exchanged with each other. In other words, the rotation member 6 may be connected to the output shaft 2 while the rotation member 4 may be connected to the input shaft 3. In this case, the rotation member 6 serves as the first rotation member while the rotation member 4 serves as the third rotation member.

In addition, in the present embodiment, the elastic member 53 is provided between the thrust member 52 and the rotation member 6 in the hysteresis portion 10. Alternatively, the elastic member 53 may be disposed between the thrust member 51 and the rotation member 4, between the thrust member 51 and the rotation member 5, or between the thrust member 52 and the rotation member 5. That is, the elastic member 53 may be desirably configured to press the thrust member 51 and either the rotation member 4 or the rotation member 5 against each other, and the thrust member 52 and either the rotation member 5 or the rotation member 6 against each other. In addition, the thrust member 51 may be configured to rotate relative to one of the rotation member 4 and the rotation member 5 to generate a friction resistance with one of the rotation member 4 and the rotation member 5. Further, the thrust member 52 may rotate relative to one of the rotation member 5 and the rotation member 6 to generate a friction resistance with one of the rotation member 5 and the rotation member 6.

Figure 5:
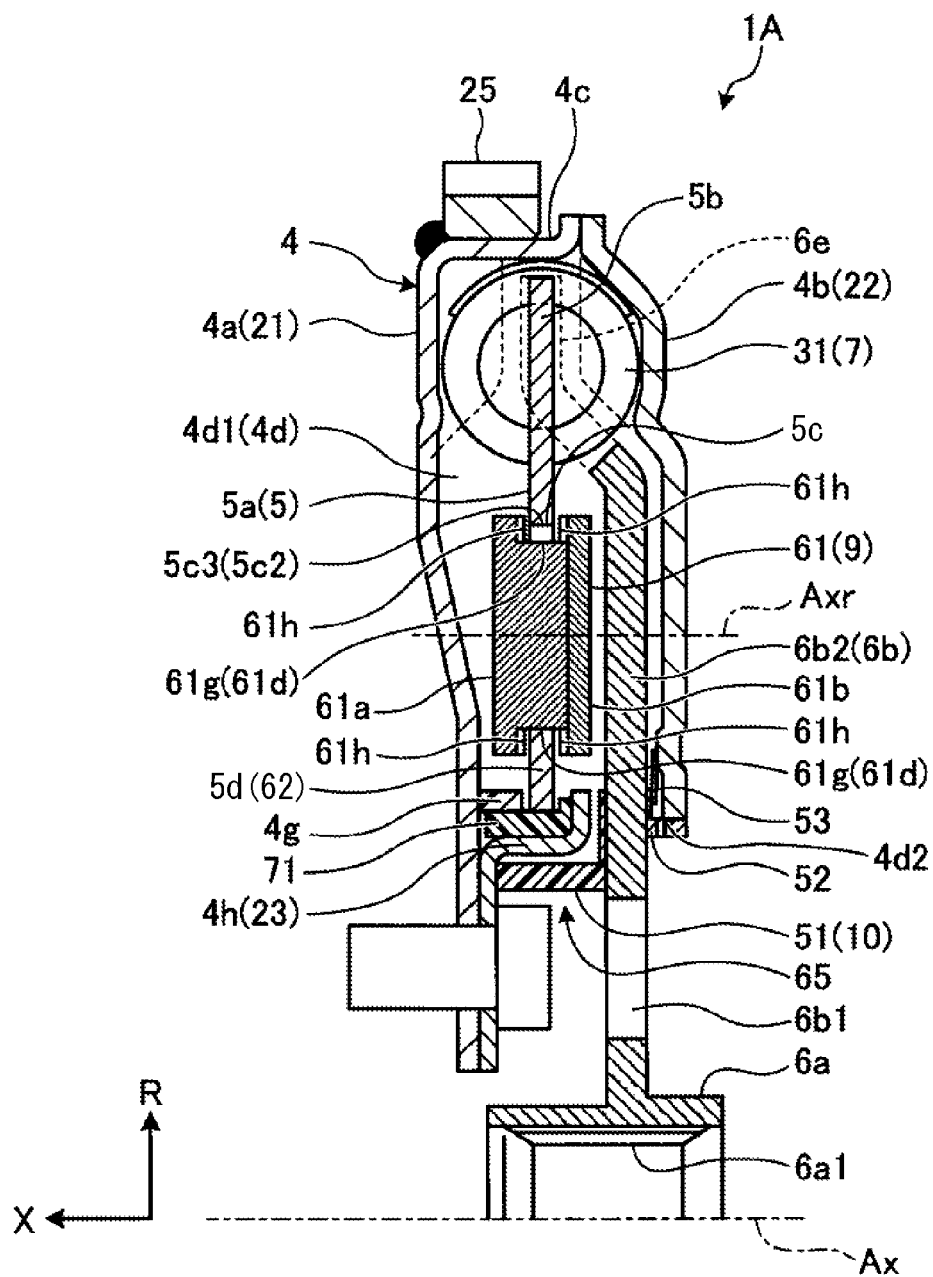
FIG. 5 is a cross-sectional view of a damper according to a second embodiment disclosed here.

A second embodiment will be explained with reference to FIG. 5. According to a damper 1A in the second embodiment, being different from the first embodiment, the elastic portions 7, 8 and also the dynamic vibration absorber 9 are housed in the housing chamber 4d.

In the second embodiment, the rotation member 6 includes the cylinder portion 6a, the wall portion 6b, and the protruding portion 6e serving as a second portion. The wall portion 6b protrudes radially outwardly from the cylindrical portion 6a and enters to be positioned within the housing chamber 4d. The wall portion 6b is formed annularly around the rotation axis Ax. The protruding portion 6e is connected to an outer edge portion of the wall portion 6b. The wall portion 6b includes a portion 6b2 serving as a first portion that faces the dynamic vibration absorber 9 in the axial direction. The protruding portion 6e is positioned at the radially outer side of the dynamic vibration absorber 9. The rolling elements 61 are positioned between the portion 6b2 of the wall portion 6b and the wall portion 4a. A clearance is formed between each of the rolling elements 61 and each of the wall portions 6b and 4a.

In the second embodiment, the rotation member 5 includes a wall portion 5d in addition to the wall portion 5a, the protruding portion 5b, and the guide portion 5c. The wall portion 5d is positioned at the radially inner side of the wall portion 5a and is away therefrom. The wall portion 5d corresponds to the restriction member 63 of the first embodiment. The wall portion 5d is connected to the wall portion 5a by a connection member. The plural rolling elements 61 are rotatably provided between the wall portions 5d and 5a. The wall portion 5d, which is formed annularly around the rotation axis Ax, enters the recess portion 61d, i.e., a portion of the wall portion 5d is positioned within the recess portion 61d. The wall portion 5d supports the rolling elements 61 in the radial direction so as to restrict the rolling elements 61 from disengaging from the wall portion 5a in a state where the rolling elements 61 are inhibited from receiving the centrifugal force and the surfaces 61g of the respective rolling elements 61 are in contact with the wall portion 5d. In a case where the rolling elements 61 are pressed against the wall portion 5a by the centrifugal force, the rolling elements 61 are away from the wall portion 5d. The width of each of the wall portions 5a and 5d in the axial direction is smaller than the width of the recess portion 61d in the axial direction. That is, at least one of the surfaces 61h and each of the wall portions 5a and 5d form a clearance therebetween. As a result, a friction between each of the rolling elements 61 and the rotation member 5 may be reduced. In addition, the wall portions 5a and 5d support the rolling elements 61 in the axial direction in a state where one of the surfaces 61h of the rolling element 61 is in contact with the wall portions 5a and 5d. As a result, the positions of the rolling elements 61 in the axial direction are determined. In the second embodiment, the wall portions 5a and 5d constitute the support portion 62.

The rotation member 5 is rotatably supported at the rotation member 4 via an intervening member 71 (a support portion or a positioning portion). The rotation member 5 is supported in the radial direction by the rotation member 4 via the intervening member 71. As a result, the position of the rotation member 5 in the radial direction is determined (i.e., the rotation member 5 is centered). The intervening member 71 is an annular member formed around the rotation axis Ax. The intervening member 71 may be made of synthetic resin material, for example. The rotation member 4 includes a fitting portion 4h fitted to (i.e., overlapping) the intervening member 71. The fitting portion 4h is formed annularly around the rotation axis Ax.

An inner peripheral edge portion of the rotation member 5 is positioned between the intervening member 71 and a wall portion 4g (a support portion) formed at the rotation member 4 in the axial direction. The rotation member 5 is supported in the axial direction by the intervening member 71 or the wall portion 4g in a state making contact with the intervening member 71 or the wall portion 4g. The wall portion 4g protrudes from the wall portion 4a to the second side in the axial direction. In the second embodiment, the intervening member 71 and the wall portion 4g are positioned at the radially inner side of the rolling elements 61. As a result, a space at the radially inner side of the rolling elements 61 is used as a space for arranging the intervening member 71 and the wall portion 4g, which may lead to a downsizing of the damper 1 in the radial direction.

In addition, the hysteresis portion 10 is directly provided, i.e., not provided via the rotation member 5, between the rotation members 4 and 6. In the second embodiment, the thrust member 51 is provided between the wall portion 4a (the plate 23) and the wall portion 6b and is disposed at the radially inner side of the fitting portion 4h. The thrust member 52 is provided between the wall portions 4b and 6b. The elastic member 53 is disposed between the wall portion 4b and the thrust member 52 to bias the thrust member 52 towards the wall portion 6b (the thrust member 51).

Further, in the second embodiment, the opening portion 4d2 of the housing chamber 4d is closed or sealed by the wall portion 4g, the intervening member 71, the plate 23 and the thrust member 51. That is, the wall portion 4g, the intervening member 71, the plate 23 and the thrust member 51 constitute the closing portion 65 that closes the opening portion 4d2. Accordingly, because the intervening member 71 and the plate 23 which determine the position of the rotation member 5 in the axial direction also function as the seal portion, the number of components may be reduced.

Furthermore, in the second embodiment, grease in the housing chamber 4d is provided at the radially outer side of the rolling elements 61 which are positioned at the most radially outer side within a moving rage of the rolling elements 61 in the radial direction. That is, the rolling elements 61 are inhibited from being immersed in grease. Therefore, the rolling elements 61 are likely to roll or rotate appropriately.

As mentioned above, in the second embodiment, the housing chamber 4d is provided at the rotation member 4 so as to accommodate or house the elastic portions 7, 8 and the dynamic vibration absorber 9. Thus, as compared to a construction where the elastic portions 7, 8 and the dynamic vibration absorber 9 are housed in separate chambers from one another, the elastic portions 7, 8 and the dynamic vibration absorber 9 are arranged in an intensive manner, which may lead to a reduced space for arrangements of the elastic portions 7, 8 and the dynamic vibration absorber 9.

In addition, the rotation member 4 receives a rotational driving force from the outside of the damper 1A and the rotation member 6 includes the portion 6b2 arranged facing the dynamic vibration absorber 9 in the axial direction and the protruding portion 6e connected to the portion 6b2 and positioned at the radially outer side of the dynamic vibration absorber 9. Thus, as an example, a space at the radially outer side of the dynamic vibration absorber 9 is used for arrangement of the protruding portion 6e, which may lead to a downsizing of the damper 1A.

Figure 6:
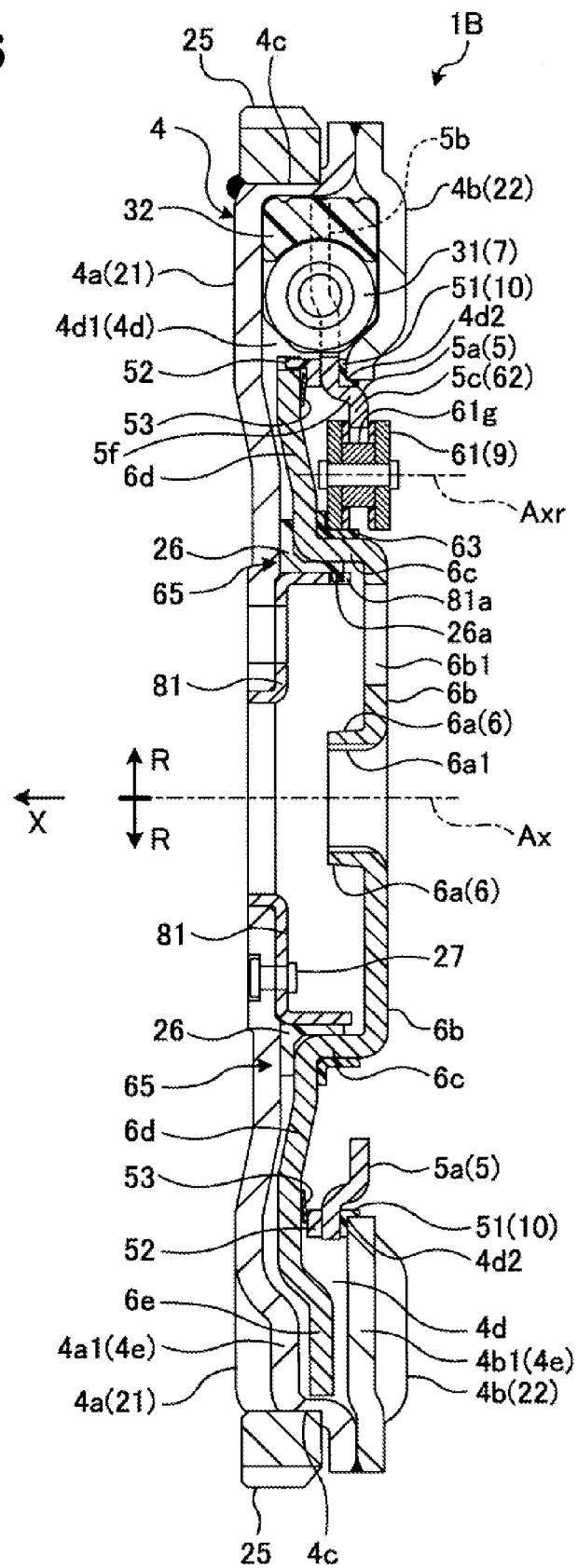
FIG. 6 is a cross-sectional view of a damper according to a third embodiment disclosed here.

A third embodiment will be explained with reference to FIG. 6. A damper 1B in the third embodiment includes a cylinder member 81 (a member) instead of the plate 23 (see FIG. 3) in the first embodiment.

The cylinder member 81 is formed in a stepped cylinder form. The cylinder member 81 is formed annularly around the rotation axis Ax. The cylinder member 81 is connected or secured to the plate 21 via the fastening member 27 such as a rivet, for example, in a state overlapping the plate 21 at the second side thereof in the axial direction. An engagement portion 81a (a cutout) in a recessed form is formed at the cylinder member 81.

An engagement portion 26a (a hook portion) in a protruding form is formed at the thrust member 26. The engagement portion 26a engages with the engagement portion 81a of the cylinder member 81 in the circumferential direction. Accordingly, the thrust member 26 integrally rotates with the cylinder member 81 (the rotation member 4).

In addition, a portion 5f is formed at the wall portion 5a of the rotation member 5. The portion 5f overlaps a radially inner end portion of the thrust member 51 in the radial direction and makes contact with the aforementioned end portion. The thrust member 51 supports the rotation member 5 in the radial direction in a state being interposed between the rotation members 4 and 5 and making contact with the portion 5f of the wall portion 5a. The movement of the rotation member 5 in the radial direction may be restricted by the thrust member 51 accordingly. In the third embodiment, the thrust member 51 serves as the third intervening member and a fifth intervening member.

Figure 7:
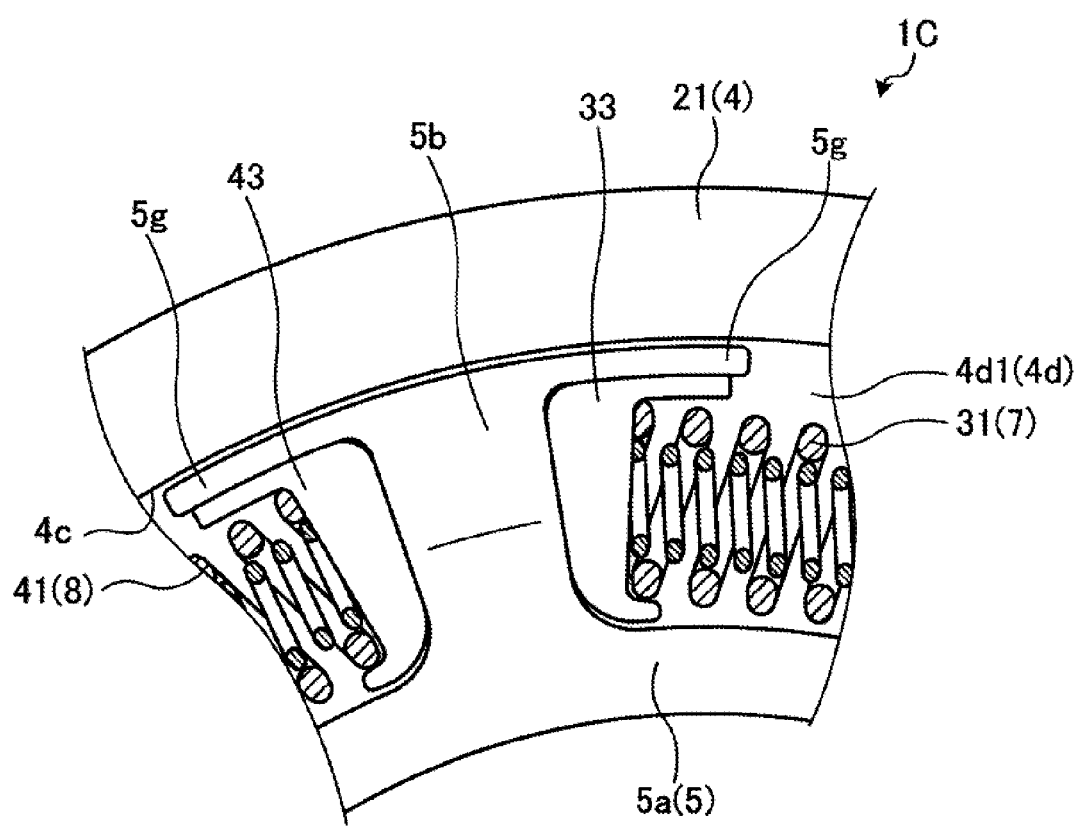
FIG. 7 is a front view of a portion of a damper when viewed in the axial direction according to a fourth embodiment disclosed here.

A fourth embodiment will be explained with reference to FIG. 7. According to a damper 1C of the fourth embodiment, being different from the first embodiment, two protrusions 5g are formed at a radially outer end side of the protruding portion 5b of the rotation member 5. Specifically, the two protrusions 5g are formed at opposed end portions of the protruding portion 5b in the circumferential direction. The two protrusions 5g protrude in opposite directions from each other along the circumferential direction from the opposed end portions of the protruding portion 5b in the circumferential direction. The protrusions 5g are positioned among the connection portion 4c of the rotation member 4 and the support members 33, 43. The support members 33 and 43 are supported by the protruding portion 5b and the protrusions 5g.

Figure 8:
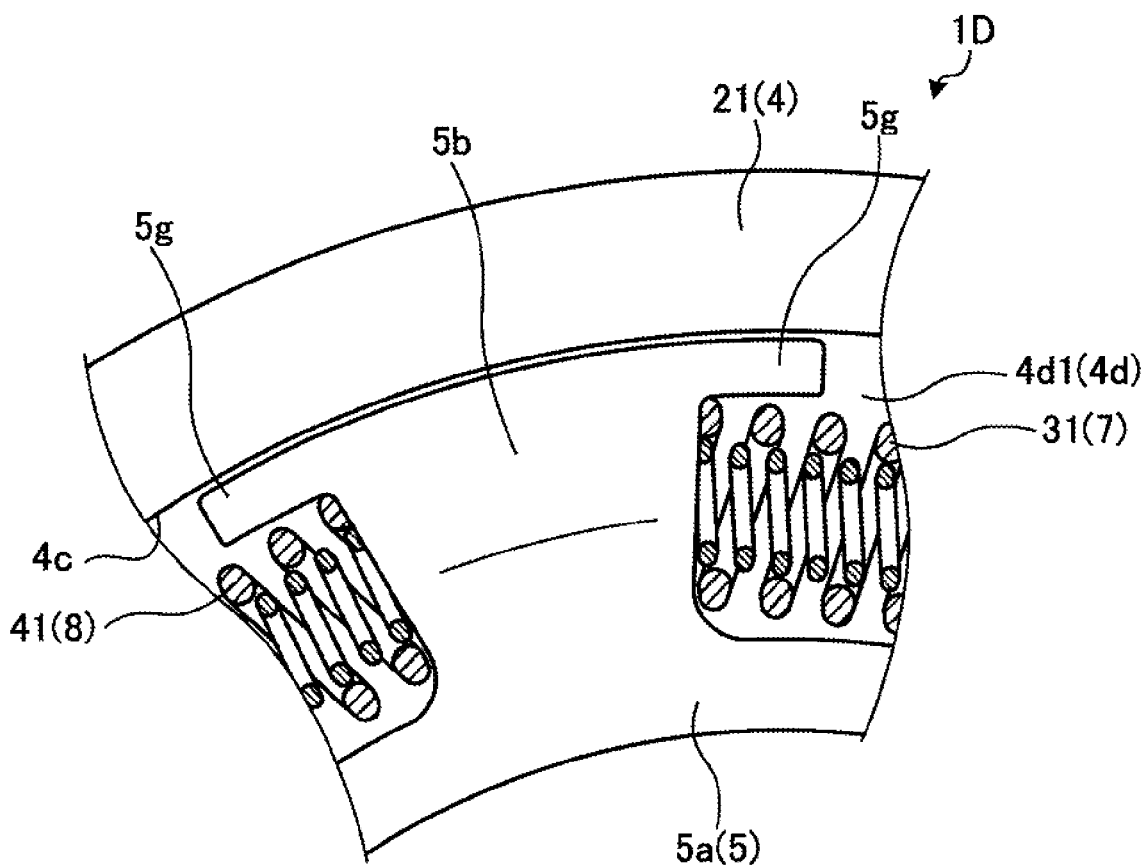
FIG. 8 is a front view of a portion of a damper when viewed in the axial direction according to a fifth embodiment disclosed here.

A fifth embodiment will be explained with reference to FIG. 8. According to a damper 1D of the fifth embodiment, being different from the first embodiment, the two protrusions 5g are formed at the radially outer end side of the protruding portion 5b of the rotation member 5. Specifically, the two protrusions 5g are formed at opposed end portions of the protruding portion 5b in the circumferential direction. In the same way as the fourth embodiment, the two protrusions 5g protrude in opposite directions from each other along the circumferential direction from the opposed end portions of the protruding portion 5b in the circumferential direction. In the fifth embodiment, the support members 33 and 43 (see FIG. 2) are not provided. That is, the elastic members 31 and 41 are in contact with the protruding portion 5b. Each of the protrusions 5g is positioned between the connection portion 4c of the rotation member 4 and either the elastic member 31 or 41.

Figure 9:
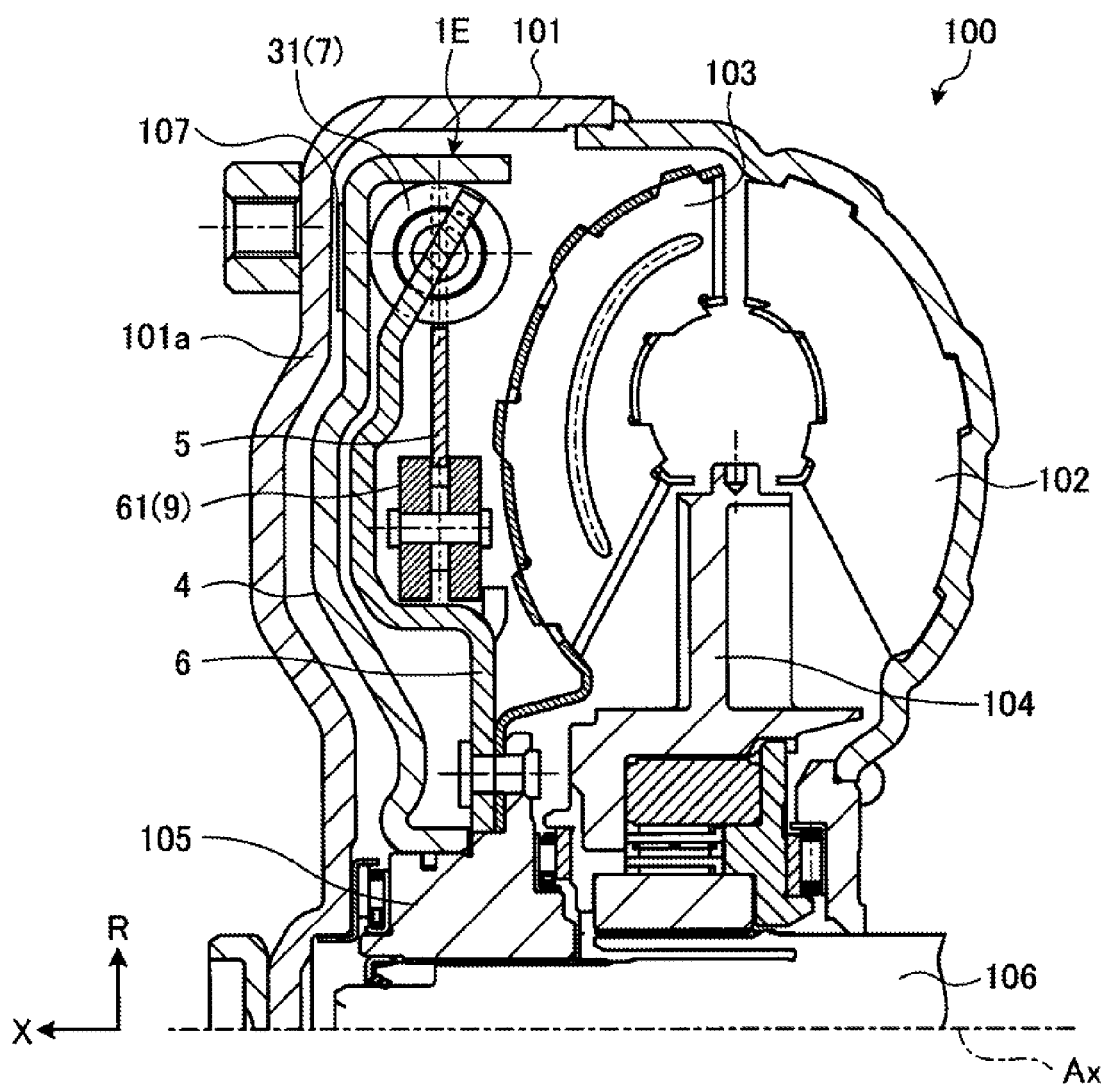
FIG. 9 is a cross-sectional view of a torque converter including a damper according to a sixth embodiment disclosed here.

A sixth embodiment will be explained with reference to FIG. 9. A damper 1E serving as a lock-up damper according to the sixth embodiment is mounted to a torque converter 100.

The torque converter 100 includes a housing 101 that is rotatable about the rotation axis Ax. The housing 101 houses therein a pump impeller 102, a turbine runner 103, a stator 104, and the damper 1E. In addition, a working fluid (oil) is housed at an inside of the housing 101. That is, in the sixth embodiment, the damper 1E is immersed in the working fluid. The pump impeller 102 is connected or secured to the housing 101 so as to integrally rotate therewith. The turbine runner 103 is connected or secured to a shaft 106 via a turbine hub 105 to integrally rotate with the shaft 106. Torque (rotation) of the shaft 106 is transmitted to a transmission. The stator 104 is disposed between the pump impeller 102 and the turbine runner 103.

In the torque converter 100, torque from a power source is transmitted to the housing 101, the housing 101 then integrally rotating with the pump impeller 102. Torque of the pump impeller 102 is transmitted to the turbine runner 103 via the working fluid so that the turbine runner 103 rotates. Because of the rotation of the turbine runner 103, the turbine hub 105 and the shaft 106 integrally rotate with the turbine runner 103.

In the same way as the dampers 1, 1A, 1B, 1C and 1D in the first to fifth embodiments, the damper 1E includes the rotation members 4 to 6, the elastic portions 7, 8 (in FIG. 9, the elastic portion 8 is omitted), the dynamic vibration absorber 9, and the like.

The rotation member 4 serving as a lock-up piston faces a wall portion 101a of the housing 101 formed at the first side (the left side in FIG. 11) in the axial direction. A friction member 107 is provided at a surface of the rotation member 4 facing the wall portion 101a. The rotation member 4 is provided to be movable in the axial direction between a position at which the friction member 107 is away from the wall portion 101a and a position at which the friction member 107 is in contact with the wall portion 101a. The rotation member 6 is connected or secured to the turbine runner 103 and the turbine hub 105 to integrally rotate therewith.

In a case where the torque is not transmitted from the power source to the housing 101, the friction member 107 is away from the wall portion 101a. In a case where the torque is transmitted from the power source to the housing 101, the pump impeller 102 starts rotating. When a rotation speed of the pump impeller 102 increases, the turbine runner 103 starts rotating. At this time, the torque is transmitted from the pump impeller 102 to the turbine runner 103 via the working fluid, which generates a torque transmission loss. Thus, in a state where the friction member 107 is away from the wall portion 101a, a rotation speed of the turbine runner 103 is smaller than that of the pump impeller 102.

In a case where the rotation speed of the turbine runner 103 exceeds a specified rotation speed, the working fluid between the rotation member 4 and the wall portion 101a is discharged so that a pressure of working fluid at one side of the rotation member 4 facing the wall portion 101a and a pressure of working fluid at the other side of the rotation member 4 opposite from the wall portion 101a, i.e., facing the turbine runner 103, are differentiated, resulting in a pressure difference. Because of the foregoing pressure difference, the rotation member 4 moves towards the wall portion 101a to press the friction member 107 against the wall portion 101a. The torque of the housing 101 is transmitted to the rotation member 4 accordingly. The rotation member 4 then integrally rotates with the housing 101 so that the torque of the housing 101 is directly transmitted to the turbine runner 103 via the damper 1E. As a result, the torque of a driving source is transmitted to the turbine runner 103 with a high efficiency. In a case where the friction member 107 is pressed against the wall portion 101a, a torque fluctuation (an impact torque) generated by a speed difference between the housing 101 and the turbine runner 103 is absorbed by the elastic portions 7 and 8 of the damper 1E.

The aforementioned embodiments are examples and therefore changes or modifications including omissions, replacements and combinations, for example, may be appropriately conducted. Constructions, forms, and specifications (configurations, variations, directions, shapes, sizes, lengths, widths, thicknesses, heights, numbers, arrangements, positions and materials, for example) may be appropriately changed. For example, the third rotation member may be a flywheel connected to a clutch disc so that a clutch can be connected to a manual transmission.

According to the aforementioned first to sixth embodiments, the damper 1, 1A, 1B, 1C, 1D, 1E includes the rotation member 4 being rotatable around the rotation axis Ax, the rotation member 5 being rotatable around the rotation axis Ax, the rotation member 6 being rotatable around the rotation axis Ax, the elastic portion 7 interposed between the rotation member 4 and the rotation member 5 and being elastically deformed by a relative rotation between the rotation member 4 and the rotation member 5, the elastic portion 8 interposed between the rotation member 5 and the rotation member 6 and being elastically deformed by a relative rotation between the rotation member 5 and the rotation member 6, and the dynamic vibration absorber 9 including the rolling element 61 that is positioned at the inner side relative to the elastic portion 7 and the elastic portion 8 in the radial direction of the rotation axis Ax, the rolling element 61 being rotatable relative to the rotation member 5.

In addition, at least one of the elastic portion 7 and the elastic portion 8 includes the plural elastic members 31, 41 connected in series in the circumferential direction of the rotation axis Ax.

According to the second embodiment, one of the rotation member 4 and the rotation member 6 includes the housing chamber 4d housing the elastic portion 7, the elastic portion 8 and the dynamic vibration absorber 9.

In addition, the rotation member 6 includes the portion 6b2 arranged facing the dynamic vibration absorber 9 in the axial direction of the rotation axis Ax and the protruding portion 6e connected to the portion 6b2 and positioned at the outer side relative to the dynamic vibration absorber 9 in the radial direction of the rotation axis Ax.

According to the first, third, fourth, fifth and sixth embodiments, the damper 1, 1B, 1C, 1D, 1E includes the thrust member 26 interposed between the rotation member 4 and the rotation member 6, and the restriction member 63 interposed between the rotation member 6 and the rolling element 61. The rotation member 4 supports the rotation member 6 via the thrust member 26 and the rotation member 6 supports the rolling element 61 via the restriction member 63.

In addition, the damper 1, 1B, 1C, 1D, 1E includes the thrust member 51 provided to be rotatable around the rotation axis Ax and interposed between the rotation member 4 and the rotation member 5, the thrust member 51 generating a friction resistance in a case where the rotation member 4 and the rotation member 5 rotate relative to each other, the thrust member 52 provided to be rotatable around the rotation axis Ax and interposed between the rotation member 5 and the rotation member 6, the thrust member 52 generating a friction resistance in a case where the rotation member 5 and the rotation member 6 rotate relative to each other, and the elastic member 53 causing the thrust member 51 and one of the rotation member 4 and the rotation member 5 to be pressed against each other and causing the thrust member 52 and one of the rotation member 5 and the rotation member 6 to be pressed against each other. One of the rotation member 4 and the rotation member 6 includes the housing chamber 4d that houses the elastic portion 7 and the elastic portion 8, the housing chamber 4d including the opening portion 4d2. The rolling element 61 is formed at the outside of the housing chamber 4d. The thrust member 51, the thrust member 52 and the elastic member 53 constitute a portion of the closing portion 65 that closes the opening portion 4d2.

According to the third embodiment, the damper 1B further includes the thrust member 51 interposed between the rotation member 4 and the rotation member 5 and supporting the rotation member 5 in the radial direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper comprising:
a first rotation member being rotatable around a rotation axis;
a second rotation member being rotatable around the rotation axis;
a third rotation member being rotatable around the rotation axis;
a first elastic portion interposed between the first rotation member and the second rotation member and being elastically deformed by a relative rotation between the first rotation member and the second rotation member;
a second elastic portion interposed between the second rotation member and the third rotation member and being elastically deformed by a relative rotation between the second rotation member and the third rotation member; and
a centrifugal absorber including a rolling element that is positioned at an inner side relative to the first elastic portion and the second elastic portion in a radial direction of the rotation axis, the rolling element being supported by the third rotation member and, while in contact with an inwardly protruding portion of the second rotation member and an outwardly recessed portion of the second rotation member, rotatable relative to the second rotation member.

2. The damper according to claim 1, wherein at least one of the first elastic portion and the second elastic portion includes a plurality of elastic members connected in series in a circumferential direction of the rotation axis.

3. The damper according to claim 1, wherein one of the first rotation member and the third rotation member includes a housing chamber housing the first elastic portion, the second elastic portion and the centrifugal absorber.

4. The damper according to claim 1, wherein the third rotation member includes a first portion arranged facing the centrifugal absorber in an axial direction of the rotation axis and a second portion connected to the first portion and positioned at an outer side relative to the centrifugal absorber in the radial direction of the rotation axis.

5. The damper according to claim 1, further comprising:
a first intervening member interposed between the first rotation member and the third rotation member; and
a second intervening member interposed between the third rotation member and the rolling element, wherein the first rotation member supports the third rotation member via the first intervening member and the third rotation member supports the rolling element via the second intervening member.

6. The damper according to claim 1, further comprising:
a third intervening member provided to be rotatable around the rotation axis and interposed between the first rotation member and the second rotation member, the third intervening member generating a friction resistance in a case where the first rotation member and the second rotation member rotate relative to each other;
a fourth intervening member provided to be rotatable around the rotation axis and interposed between the second rotation member and the third rotation member, the fourth intervening member generating a friction resistance in a case where the second rotation member and the third rotation member rotate relative to each other; and
a third elastic portion causing the third intervening member and one of the first rotation member and the second rotation member to be pressed against each other and causing the fourth intervening member and one of the second rotation member and the third rotation member to be pressed against each other,
one of the first rotation member and the third rotation member including a housing chamber that houses the first elastic portion and the second elastic portion, the housing chamber including an opening portion,
the rolling element being formed at an outside of the housing chamber, the third intervening member, the fourth intervening member and the third elastic portion constituting a portion of a closing portion that closes the opening portion.

7. The damper according to claim 1, further comprising a fifth intervening member interposed between the first rotation member and the second rotation member and supporting the second rotation member in the radial direction.

* * * * *